Figures 1, 3:
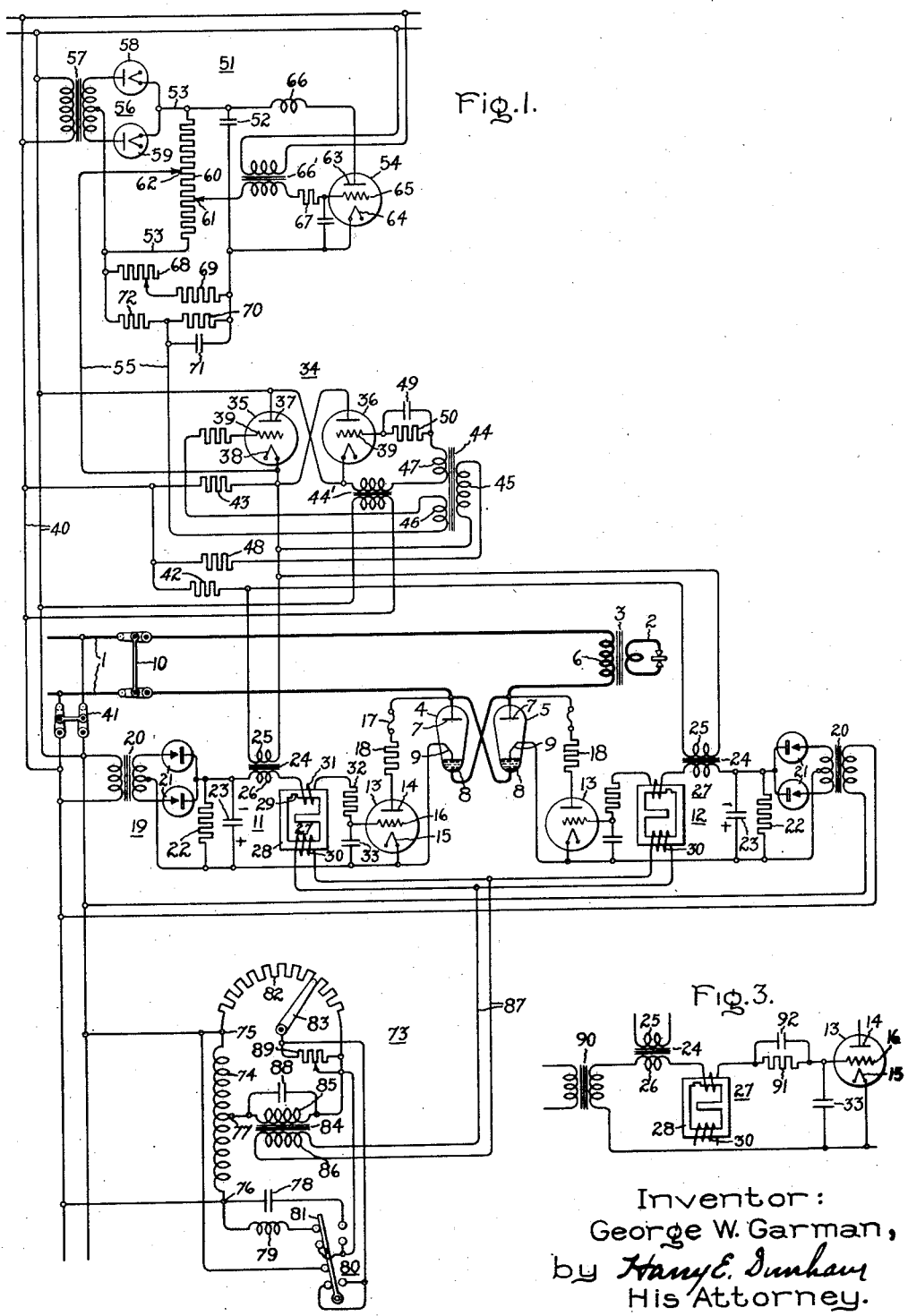

Inventor:
George W. Garman,
by Harry E. Dunham
His Attorney.

Inventor:
George W. Garman,
by Harry E. Dunham
His Attorney.

Patented Feb. 13, 1940

2,190,514

UNITED STATES PATENT OFFICE 2,190,514

ELECTRIC VALVE CIRCUITS

George W. Garman, Scotia, N. Y., assignor to General Electric Company, a corporation of New York Application January 28, 1938, Serial No. 187,429

9 Claims. (Cl. 250—27)

My invention relates to electric circuits and more particularly to electric valve circuits.

In the application of electric valves to electric translating circuits, it is frequently desirable to effect periodic energization of a load circuit and to control the amount of energy or power transmitted thereto during each interval of energization. Furthermore, it is desirable to control the length of the periods of energization as well as the interval of time between the successive periods of energization. For example, in electric welding circuits, it is important in line or seam welding operations to energize the welding circuit periodically and to control the length of the periods of energization and the amount of energy transmitted during each interval. Various electric valve systems have been devised heretofore for accomplishing this type of control. Many of the prior art arrangements have involved the use of complicated and expensive control equipment. There has been evidenced a decided need for improved apparatus which is simple in construction and arrangement and which is susceptible of positive and reliable action without entailing frequent inspections and renewal of parts.

It is an object of my invention to provide new and improved electric control circuits.

It is another object of my invention to provide new and improved circuits for controlling electric valve apparatus.

It is a further object of my invention to provide new and improved control circuits for electric valve apparatus whereby a load circuit is periodically energized and whereby the length of the periods of energization and the energy transmitted may be controlled.

In accordance with the illustrated embodiments of my invention, I provide improved excitation or control circuits for electric valve apparatus which effect periodic energization of a load circuit through electric valve apparatus and which afford reliable means for controlling the energy transmitted to the load circuit during the periodic energizations. In one embodiment, the excitation circuit includes a negative unidirectional biasing potential which tends to maintain a control electric valve non-conductive. To establish the intervals of energization of the load circuit and to control the ratio of the intervals of conduction to the intervals of nonconduction, I provide means, such as an electric valve circuit, which introduces into the excitation circuit a train of half cycles of alternating voltage which are opposite in effect to that of the biasing potential and which tend to render the control electric valve conductive, but which are of a value or magnitude insufficient to overcome the effect of the biasing potential. I provide an additional means, such as a saturable inductive device, for introducing into the excitation circuit another alternating voltage, preferably of peaked wave form which also tends to render the electric valve means conductive, but which in itself is not of sufficient magnitude to render the electric valve means conductive. The two alternating voltages in their conjoint action render the electric valve means conductive during the predetermined number of half cycles established by the first alternating voltage. I provide means for shifting the phase of the alternating voltage of peaked wave form with respect to the anode-cathode voltage of the electric valve means to control the time during each of the predetermined number of half cycles at which the electric valve means is rendered conductive. In this manner, the energy transmitted to the load circuit during each half cycle and during the number of half cycles is controllable.

In another embodiment of my invention the excitation circuit includes an alternating voltage as a biasing potential and which is in substantial phase opposition to the trains of half cycles of alternating voltage which determine the intervals of conduction. This alternating biasing voltage may also be displaced 180 electrical degrees relative to the anode-cathode voltage of the electric valve to be controlled. The electric valve means is rendered conductive only when the trains of half cycles are introduced into the excitation circuit. The joint action of the periodically applied trains of half cycles and the voltage of peaked wave form is required to render the electric valve means conductive.

Figure 2:
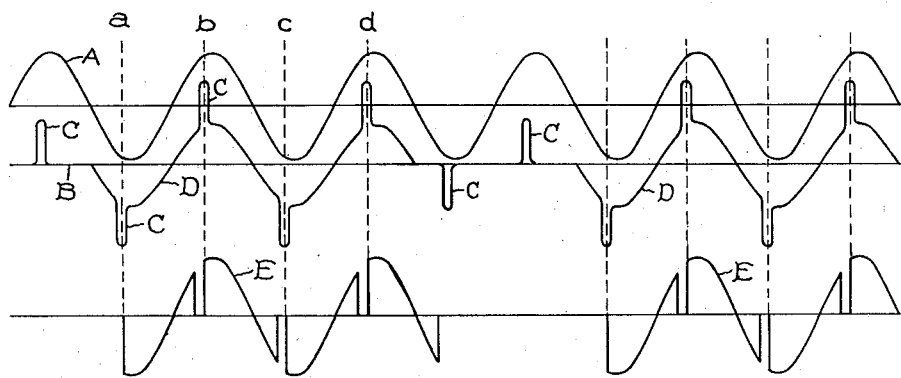
Figure 4:
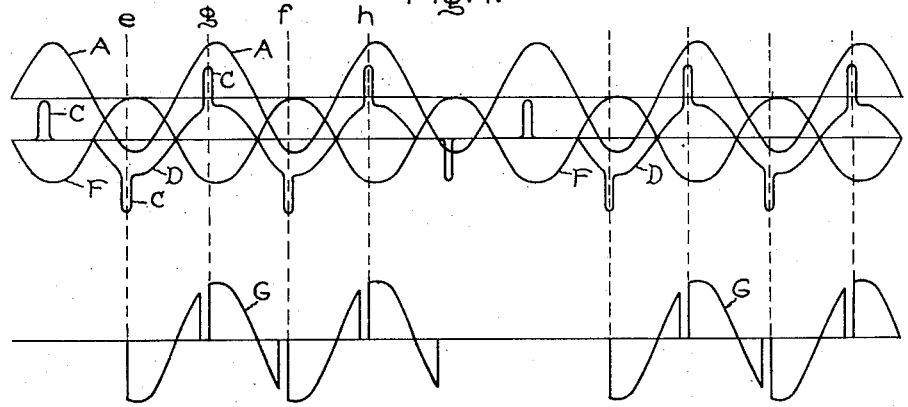

For a better understanding of my invention, reference may be had to the following description taken in connection with the accompanying drawings and its scope will be pointed out in the appended claims. Fig. 1 of the accompanying drawings diagrammatically illustrates my invention as applied to an electric welding circuit and Fig. 2 represents certain operating characteristics thereof. Fig. 3 diagrammatically illustrates a modification of the arrangement of my invention shown in Fig. 1 and Fig. 4 illustrates certain operating characteristics of the arrangement shown in Fig. 3.

Referring now to Fig. 1, I have diagrammatically illustrated my invention as applied to an electric control circuit for effecting periodic energization of a welding circuit. An alternating current supply circuit 1 is connected to a load circuit, such as a welding circuit 2, through a transformer 3 and a pair of reversely connected electric valve means 4 and 5. The electric valves 4 and 5 are connected in series relation with a primary winding 6 of transformer 3. The electric valves 4 and 5 are preferably of the type employing an ionizable medium such as a gas or a vapor and each includes an anode 7, a cathode 8 and a control member 9 which may be of the make-alive or the immersion-ignitor type comprising a material having a relatively high specific electrical resistivity compared with that of the associated cathode 8 which may be of the self-reconstructing type. A suitable circuit controlling means, such as a switch 10, may be interposed between the supply circuit 1 and the electric valves 4 and 5 to disconnect the electric valves and the transformer 3 from the supply circuit.

In order to control the energization of the immersion-ignitor control members 9 of electric valves 4 and 5, I provide excitation circuits 11 and 12 which are associated with electric valves 4 and 5, respectively. The excitation circuits 11 and 12 are similar in construction and arrangement and in order to facilitate description thereof excitation circuit 11, associated with electric valve 4, will be considered in detail. A control electric valve 13 is provided to effect the energization of the control member 9 of electric valve 4 at the proper times and during predetermined intervals. The control electric valve 13 is preferably of the type employing an ionizable medium and includes an anode 14, a cathode 15 and a control member 16 which may be of the grid type. The anode 14 of the control electric valve 13 may be connected to anode 7 of electric valve 4 and cathode 15 thereof may be connected to the immersion-ignitor control member 9 of electric valve 4. A current limiting device, such as a fuse 17, and a resistance 18 may be connected in series relation with the control electric valve 13. While the control electric valve 13 has been shown as being connected in the circuit in a manner to be responsive to the polarity of the anode-cathode voltage of the electric valve 4, it is to be understood that I may employ other arrangements in which a control electric valve effects energization of the immersion-ignitor control member 9. For example, I may employ a circuit of the type in which a condenser is periodically discharged by a control electric valve to effect the desired energization of the control member 9.

As a means for introducing into excitation circuit 11 a biasing potential which tends to maintain the control electric valve 13 nonconductive and hence tends to maintain the electric valve 4 nonconductive, I provide a bi-phase rectifier 19 including a transformer 20 and a pair of unidirectional conducting devices such as electric valves 21. The output voltage of the bi-phase rectifier 19 is impressed across a parallel connected resistance 22 and a capacitance 23 to establish a unidirectional voltage of the polarity indicated. The unidirectional voltage is connected in circuit in a manner so that a negative unidirectional biasing potential is impressed on the control member 16 of the control electric valve 13.

As an agency for introducing into the excitation circuit 11 a periodically applied voltage, such as a predetermined number of half cycles of alternating voltage which tend to render the control electric valve 13 conductive, but which is ineffective in itself to render the valve 13 conductive, I provide a transformer 24 having a primary winding 25 and a secondary winding 26 which is connected in series relation with the parallel connected resistance 22 and capacitance 23. The magnitude of the alternating voltages introduced into excitation circuit 11 by transformer 24 is insufficient to overcome the negative unidirectional biasing potential provided by the bi-phase rectifier 19, resistance 22 and capacitance 23. The voltage introduced into the excitation circuit 11 by transformer 24 is insufficient in itself to render the control electric valve 13 conductive.

A second alternating voltage is introduced into the circuit 11 to cooperate with the first alternating voltage to render the control electric valve 13 conductive during predetermined intervals of time established by the voltage introduced by transformer 24. This second alternating voltage may be produced by a saturable inductive device 27 including a core member 28 having a restricted saturable portion 29, a primary winding 30 and a secondary winding 31 which is associated with the restricted portion 29 and in which there is induced an alternating voltage of peaked wave form. A current limiting resistance 32 may be connected in series relation with secondary winding 31 of the saturable inductive device 27, and a capacitance 33 may be connected across control member 16 and cathode 15 of the control electric valve 13 to absorb extraneous transient voltages which may be present in the excitation circuit 11.

I provide a circuit 34 energized from the alternating current circuit 1 to impress an alternating voltage on the primary windings 25 of transformers 24 in excitation circuits 11 and 12. The circuit 34 may include a pair of oppositely disposed electric valves 35 and 36 which are preferably of the type employing an ionizable medium, such as a gas or a vapor, and each includes an anode 37, a cathode 38 and a control member 39. Electric valves 35 and 36 are connected to the supply circuit 1 through conductors 40 and a switch 41. Excitation circuits 11 and 12 are also connected to supply circuit 1 through the switch 41. A current limiting resistance 42 may be connected in series relation with the primary windings 25 of transformers 24, and a resistance 43 may be connected in series relation with the electric valves 35 and 36. Electric valve 36 is arranged to follow electric valve 35 and is provided with a control circuit including a transformer 44 having a primary winding 45, a secondary winding 46 and a tertiary winding 47. Primary winding 45 is arranged to be connected to conductors 40 through the electric valves 35 and 36 and a resistance 48. Any suitable biasing arrangement may be employed to impress a negative biasing potential on control member 39 of electric valve 36 and I have chosen to show a self-biasing type circuit comprising a parallel connected capacitance 49 and a resistance 50 to perform this function. Secondary winding 46 is connected to control member 39 of electric valve 35 in order to prevent retardation in phase of the control voltage impressed on this member when the electric valves 35 is rendered conductive for a predetermined number of half cycles determined by the periodic electrical quantity produced by a control circuit to be described hereinafter. A transformer 44' is provided in series relation with secondary winding 47 and the control member 39 to impress thereon a suitable biasing voltage which tends to maintain the electric valve 36 nonconductive except during those half cycles immediately following the half cycles of conduction of electric valve 35. The transformer 44' may be energized from the circuit including conductors 40.

As an agency for producing a periodic electrical quantity, such as a periodic voltage, for rendering electric valves 35 and 36 conductive for a predetermined number of half cycles of voltage of circuit 1, and hence for effecting energization of the load circuit 2 for a corresponding number of half cycles, I employ a suitable circuit 51. Circuit 51 may be of the type including a capacitance 52 which is charged from a direct current circuit 53 and which is periodically discharged through an electric valve 54 to impress a periodic voltage on control member 39 of electric valve 35 through conductors 55. The direct current circuit 53 may be energized from the alternating current circuit 1 by means of a suitable rectifying circuit 56 including a transformer 57 and a pair of unidirectional conducting devices 58 and 59. The output circuit of the rectifier 56 is connected to a suitable voltage divider including a resistance 60 having adjustable taps or connections 61 and 62. Electric valve 54 is preferably of the type employing an ionizable medium, such as a gas or a vapor, and includes an anode 63, a cathode 64 and a control member 65. An inductance 66 is connected in series relation with the electric valve 54 and serves to render the electric valve nonconductive. Control member 65 is energized so that there is impressed thereon a composite voltage having an alternating voltage component which is obtained from circuit 1 and is introduced in the circuit by means of a transformer 66'. A unidirectional voltage is also impressed on the control member 65 and is obtained by connecting the control member to contact 61 of resistance 60. A third voltage, which is a periodic voltage obtained by the periodic charge and discharge of the capacitance 52, is also impressed on the control member 65. A suitable current limiting resistance 67 may be connected in series relation with control member 65 of electric valve 54. As a means for controlling the period of the periodic electrical quantity, I employ an adjustable resistance 68 which may be connected in series relation with a resistance 69. The voltage appearing across these resistances, of course, is a periodic voltage determined by the periodic charging and discharging of capacitance 52. In order to effect precise control of the conductivities of electric valves 35 and 36 where the ratio of the period of nonconduction to the period of conduction is relatively large, I employ a parallel connected resistance 70 and a capacitance 71, which are in turn connected in series relation with a resistance 72. These last mentioned elements are connected across the serially connected resistances 68 and 69. This last feature is disclosed and claimed in United States Patent No. 2,098,052 granted November 2, 1937, on an application of Harold W. Lord and assigned to the assignee of the present application.

To impress on primary windings 30 of the saturable inductive devices 27 in excitation circuits 11 and 12 alternating voltages of predetermined phase relation relative to the voltage of supply circuit 1, and hence in order to control the amount of energy transmitted to load circuit 2 during the periodic energizations thereof, I employ a suitable circuit 73 which may be of the type disclosed and claimed in a copending patent application of Harry L. Palmer, Serial No. 179,718, filed December 14, 1937 and assigned to the assignee of the present application. Circuit 73 supplies to primary windings 30 of the saturable inductive devices 27 an alternating voltage adjustable in phase so that the voltages induced in secondary windings 31 are variable in phase throughout the first and second lagging quadrants, and is preferably arranged to produce a voltage adjustable in phase within a range extending from the power factor angle of the load circuit to about 135 electrical degrees in retardation with respect to the voltage of circuit 1. Circuit 73 includes a winding 74 having a pair of terminal connections 75 and 76 and an electrical intermediate connection 77. A pair of electric circuits is connected to electrical connection 76. One of these circuits includes a capacitance 78 and the other includes an inductance 79. A suitable circuit controlling means, such as a switch 80, is arranged to connect selectively capacitance 78 or inductance 79 in circuit and includes a movable member 81 for effecting this control. Switch 80 establishes two distinct ranges of phase shift selectively determined by the position of the movable member 81. A variable impedance element, such as a resistance 82 and an associated movable contact member 83, is connected between terminal 75 and switch 80, and serves to control the phase of the output voltage of circuit 73 within the ranges of operation established by switch 80. The output circuit of circuit 73 includes a transformer 84 having a primary winding 85 and a secondary winding 86 which is connected to primary windings 30 of the saturable inductive devices 27 through conductors 87. A capacitance 88 may be connected across primary winding 85, if desired, to reduce the current consumed from the bridge circuit. Where it is desired to prevent advancement of the phase of the voltage beyond the power factor angle established by the load circuit 2, an adjustable resistance 89 may be employed.

To explain the operation of the embodiment of my invention illustrated in Fig. 1, the system will be considered when it is operating to effect periodic energization of the load circuit 2. The ratio of the intervals of conduction to the intervals of nonconduction may be established by adjustment of resistance 68 in circuit 51. The amount of energy transmitted to the load circuit 2 during each period of energization may be controlled by adjustment of the movable contact 83 associated with resistance 82 in circuit 73. Electric valves 35 and 36 are rendered conductive periodically by the periodic voltage generated by circuit 51. The output voltage of circuit 51 which is impressed on control member 39 of electric valve 35 through conductors 55 renders the electric valve conductive, and electric valve 36 follows electric valve 35 to impress on primary windings 25 of transformers 24 a predetermined number of half cycles of alternating voltage. The control electric valves 13 in excitation circuits 11 and 12 are rendered conductive during a corresponding number of half cycles and hence effect energization of the control members 9 of electric valves 4 and 5 to transmit alternating current to load circuit 2 and to primary winding 6 of transformer 3 during these half cycles. In this manner the load circuit 2 is supplied periodicaly with a predetermined number of half cycles of current.

Considering in particular the operation of the excitation circuits 11 and 12, the voltage impressed on control members 16 of electric valves 13 is a composite voltage comprising three components. One of these components is a negative unidirectional potential appearing across the terminals of resistance 22. A second component is the alternating voltage supplied by the alternating current circuit 1 and transmitted through electric valves 35 and 36 and introduced into the excitation circuits by transformers 24. The third component is the alternating component of peaked wave form which is produced by the saturable inductive devices 27. The alternating voltages are insufficient by themselves to render electric valves 13 conductive and in order to render electric valves 13 conductive, it is necessary that both alternating voltages be present.

For a better understanding of the manner in which the excitation circuits 11 and 12 operate, reference may be had to the operating characteristics shown in Fig. 2. Curve A represents the alternating voltage of circuit 1 and hence may represent the anode-cathode voltage of one of the power electric valves, for example electric valve 4, and may also represent the voltage impressed across anode 14 and cathode 15 of the control electric valve 13 in excitation circuit 11. Curve B represents the negative unidirectional biasing potential appearing across resistance 22; and curve C represents the alternating voltage of peaked wave form introduced in excitation circuit 11 by the saturable inductive device 27. Curve D represents the alternating voltage introduced in the excitation circuit by transformer 24 and is introduced periodically by the electric valves 35 and 36. It will be observed that the voltages as represented by curves C and D are ineffective separately to render the electric valves 13 conductive but are effective when acting conjointly to render these valves conductive. For example, electric valve 13 in excitation circuit 11 is rendered conductive at time $a$ and, of course, electric valve 13 in circuit 12 will be rendered conductive at time $b$. If circuit 11 is adjusted so that electric valves 35 and 36 conduct current for four half cycles, control electric valve 13 in excitation circuit 11 will be rendered conductive at times $a$ and $c$ and control electric valve 13 in excitation circuit 12 will be rendered conductive at times $b$ and $d$. Since electric valve 36 follows electric valve 35, an even number of half cycles of voltage will be transmitted to load circuit 2. However, it is to be understood that I may employ any suitable arrangement for effecting energization of the load circuit for even or odd numbers of half cycles. Curve E represents the voltage impressed on primary winding 6 of transformer 3 and hence represents the voltage impressed on the load circuit 2 under the above mentioned conditions.

The phase position of the alternating voltages of peaked wave form introduced in excitation circuits 11 and 12 by the saturable devices 12 may be controlled by the adjustment of the movable contact 83 in circuit 73. Furthermore, the phase of the voltages of peaked wave form may be controlled throughout the first and second lagging quadrants to control the amount of energy transmitted to load circuit 2 during the periodic energization of the circuit. For a more detailed description of the operation of circuit 73 reference may be had to the above identified patent application of Harry L. Palmer.

In Fig. 3 there is diagrammatically illustrated a modification of the embodiment of my invention shown in Fig. 1 and corresponding elements have been assigned like reference numerals. The circuit of Fig. 3 relates to a modified arrangement for the control electric valves 13 in which the three control voltages employed are alternating. In order to introduce into the excitation circuit an alternating voltage which tends to maintain the electric valve 13 nonconductive, I employ a transformer 90. The phase of the voltage introduced in the excitation circuit by transformer 90 may be 180 electrical degrees out of phase with respect to the voltage introduced into the circuit by transformer 24. If desired, I may employ means for impressing on control member 16 a negative unidirectional biasing potential, such as a self-biasing type circuit comprising a parallel connected resistance 91 and a capacitance 92. The alternating voltages produced by transformer 24 and the saturable device 27 are each independently ineffective to render the electric valve 13 conductive, but are of proper magnitude so that when acting conjointly the electric valve 13 is rendered conductive.

The operation of the modification of my invention shown in Fig. 3 is substantially the same as that explained above in connection with Fig. 1. The characteristics shown in Fig. 4 may be referred to more fully to explain the operation of the arrangement in Fig. 3. The curves of Fig. 4 which relate to similar operating characteristics shown in Fig. 2 have been assigned like reference characters. The voltage introduced in the excitation circuit by the transformer 90 is represented by curve F. It is understood that this voltage may be displaced substantially 180 electrical degrees with respect to the anode-cathode voltage of electric valve 13 and that it may be displaced substantially 180 electrical degrees relative to the anode-cathode voltage of electric valve 4 and it is also displaced 180 electrical degrees with respect to the alternating voltage introduced into the circuit by transformer 24 which is represented by curve D. The alternating voltage of peaked wave form is ineffective to render the electric valve 13 conductive except during those intervals when the transformer 24 is energized by electric valves 35 and 36. At times $e$ and $f$ the electric valve 13 in one of the excitation circuits will be rendered conductive; and at times $g$ and $h$, electric valve 13 in the other excitation circuit will be rendered conductive. Curve G represents the voltage impressed on the load circuit 2. Of course, it is to be understood that the period of energization of the load circuit 2 is controlled by controlling the number of half cycles of alternating voltage introduced into the excitation circuit by transformer 24 and that the amount of energy transmitted during these periods of energization is controllable by controlling the phase of the alternating voltage of peaked wave form introduced into the circuits by inductive devices 27.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, an alternating current circuit, an electric valve means connected to said circuit and having a control member for controlling the conductivity thereof, and an excitation circuit for energizing said control member comprising means for impressing thereon a biasing potential tending to maintain said electric valve means nonconductive, means for impressing on said control member a voltage tending to render said electric valve means conductive during a predetermined number of half cycles of voltage of said alternating current circuit but being of a value insufficient to overcome said biasing potential and means for impressing on said control member an alternating voltage which cooperating with said voltage is effective to render said electric valve means conductive during said number of half cycles.

2. In combination, an alternating current circuit, an electric valve means connected to said circuit and having a control member for controlling the conductivity thereof, and an excitation circuit for energizing said control member comprising means for impressing thereon a biasing potential tending to maintain said electric valve means nonconductive, means for impressing on said control member a periodic voltage being opposite in effect to said biasing potential but being of a value insufficient to overcome said biasing potential and means for impressing on said control member an alternating voltage which cooperating with said periodic voltage is effective to render said electric valve means conductive at predetermined times during cycles of voltage of said alternating current circuit.

3. In combination, an alternating current circuit, an electric valve means connected to said circuit and having a control member for controlling the conductivity thereof, and an excitation circuit for energizing said control member comprising means for impressing thereon a biasing potential tending to maintain said electric valve means nonconductive, means for impressing on said control member an alternating voltage tending to render said electric valve means conductive during a predetermined number of half cycles of voltage of said alternating current circuit but being of a value insufficient to overcome said biasing potential and means for impressing on said control member a second alternating voltage which cooperating with the first mentioned alternating voltage is effective to render said electric valve means conductive at a predetermined time during each positive half cycle of anode-cathode voltage of said electric valve means during said predetermined number of half cycles.

4. In combination, an alternating current circuit, an electric valve means connected to said circuit and having a control member for controlling the conductivity thereof, and an excitation circuit for energizing said control member comprising means for impressing thereon a biasing potential tending to maintain said electric valve means nonconductive, means for impressing on said control member an alternating voltage tending to render said electric valve means conductive during a predetermined number of half cycles of voltage of said alternating current circuit and being of a value insufficient to overcome said biasing potential and means for impressing on said control member an alternating voltage of peaked wave form which in cooperation with said first mentioned alternating voltage is effective to render said electric valve means conductive during said number of half cycles.

5. In combination, an alternating current circuit, an electric valve means connected to said circuit and having a control member for controlling the conductivity thereof, and an excitation circuit for energizing said control member comprising means for impressing thereon a biasing potential tending to maintain said electric valve means nonconductive, means energized from said alternating current circuit for impressing on said control member a predetermined number of half cycles of alternating voltage tending to render said electric valve means conductive but being of a value insufficient to overcome said biasing potential, means for impressing on said control member a second alternating voltage which cooperating with said first mentioned alternating voltage is effective to render said electric valve means conductive and means for controlling the phase of said second alternating voltage with respect to the voltage of said alternating current circuit to control the time at which said electric valve means is rendered conductive during each of the predetermined number of half cycles.

6. In combination, an alternating current circuit, an electric valve means connected to said circuit and having a control member for controlling the conductivity thereof, means for impressing on said control member a biasing potential tending to maintain said electric valve means nonconductive, an electronic discharge means energized from said alternating current circuit for impressing on said control member a predetermined number of half cycles of voltage of said alternating current circuit and being of a value insufficient to overcome said biasing potential, and means for impressing on said control member a second alternating voltage which cooperating with the first mentioned alternating voltage is effective to render said electric valve means conductive during said number of half cycles.

7. In combination, an alternating current circuit, an electric valve means connected to said circuit and having a control member for controlling the conductivity thereof, means for impressing on said control member a biasing potential tending to maintain said electric valve means nonconductive, an electronic discharge means energized from said alternating current circuit and being arranged when in a conducting condition to impress a predetermined number of half cycles of alternating voltage on said control member, said alternating voltage being of a value insufficient to overcome said biasing potential, a circuit for generating a periodic electrical quantity to render said electronic discharge means conductive to establish said predetermined number of half cycles of voltage, and means for impressing on said control member a second alternating voltage which cooperating with the first mentioned alternating voltage is effective to render said electric valve means conductive during said number of half cycles.

8. In combination, an alternating current circuit, an electric valve means connected to said circuit and having a control member for controlling the conductivity thereof, and an excitation circuit for energizing said control member comprising means for impressing thereon a negative unidirectional biasing potential tending to maintain said electric valve means nonconductive, means for impressing on said control member an alternating voltage tending to render said electric valve means conductive during a predetermined number of half cycles of voltage of said alternating current circuit but being of a value insufficient to overcome said biasing potential and means for impressing on said control member a second alternating voltage which cooperating with the first mentioned alternating voltage is effective to render said electric valve means conductive at a predetermined time during each of said number of half cycles.

9. In combination, an alternating current circuit, an electric valve means connected to said circuit and having a control member for controlling the conductivity thereof, and an excitation circuit for energizing said control member comprising means for impressing thereon an alternating biasing potential tending to maintain said electric valve means nonconductive, means for impressing on said control member a second alternating voltage tending to render said electric valve means conductive during a predetermined number of half cycles of voltage of said alternating current circuit but being of a value insufficient to overcome said biasing potential, said last mentioned alternating voltage being in substantial phase opposition to said alternating biasing potential and means for impressing on said control member a third alternating voltage which cooperating with said second alternating voltage is effective to render said electric valve means conductive at a predetermined time during each of said number of half cycles.

GEORGE W. GARMAN.